(12) United States Patent
Dermody, IV

(10) Patent No.: US 8,157,820 B1
(45) Date of Patent: Apr. 17, 2012

(54) END PLATE MOUNTING SYSTEM FOR A BRAIDED SLEEVE WITH INTEGRAL FLANGED END AND ITS ASSOCIATED METHOD OF MANUFACTURE

(76) Inventor: William E. Dermody, IV, Sparta, NJ (US)

( * ) Notice: Subject to any disclaimer, the term of this patent is extended or adjusted under 35 U.S.C. 154(b) by 344 days.

(21) Appl. No.: 12/496,160

(22) Filed: Jul. 1, 2009

Related U.S. Application Data

(63) Continuation-in-part of application No. 11/401,215, filed on Apr. 11, 2006, now Pat. No. 8,002,781.

(51) Int. Cl.
*A61B 17/08* (2006.01)
*A61F 2/06* (2006.01)

(52) U.S. Cl. .......... 606/151; 156/148; 174/72; 174/109; 174/397; 606/191; 606/198; 606/108

(58) Field of Classification Search .................. 606/151, 606/153, 191, 198, 108; 156/148; 174/72, 174/109, 397
See application file for complete search history.

(56) References Cited

U.S. PATENT DOCUMENTS

| 2,402,050 A * | 6/1946 | Ingalls .......................... 174/397 |
| 5,186,992 A | 2/1993 | Kite, III |
| 6,674,005 B2 * | 1/2004 | Yagi et al. .................. 174/72 A |

\* cited by examiner

*Primary Examiner* — Vy Q Bui
(74) *Attorney, Agent, or Firm* — LaMorte & Associates

(57) ABSTRACT

A system and method of attaching a braided sleeve to a junction box so that the braided sleeve completely protects any cable or wire leading from the junction box. To attach the braided sleeve to the junction box, one end of the braided sleeve is engaged with a clamp. A faceplate is provided for the junction box. The clamp is interposed between the faceplate and the junction box, wherein the braided sleeve extends through an opening in the faceplate. The faceplate is mounted to the junction box or to a receptacle within the junction box. The clamp device is too large to pass through the opening in the faceplate. Consequently, the clamp and the end of the braided sleeve become trapped between the faceplate and the junction box. Any wire or cable that leads to the junction box passes through the center of the braided sleeve.

15 Claims, 5 Drawing Sheets

END PLATE MOUNTING SYSTEM FOR A BRAIDED SLEEVE WITH INTEGRAL FLANGED END AND ITS ASSOCIATED METHOD OF MANUFACTURE

RELATED APPLICATIONS

This application is a continuation-in-part of U.S. patent Ser. No. 11/401,215, filed Apr. 11, 2006, now U.S. Pat. No. 8,002,781 entitled, Braided Sleeve With Integral Flanged End And Its Associated Method Of Manufacture.

BACKGROUND OF THE INVENTION

1. Field of the Invention

In general, the present invention relates to braided sleeves and the manufacturing methods used to produce braided sleeves. More particularly, the present invention relates to termination configurations for the free ends of braided sleeves and the structures used to join braided sleeves to mounting end plates.

2. Prior Art Description

Braided sleeves are used throughout industry to protect the exterior of many types of flexible cables and tubes. Braided sleeves are essentially tubes of interwoven plastic or fiberglass strands. Accordingly, braided sleeves are highly flexible and can be readily placed around wiring cables, plastic tubing and other such elements.

Braided sleeves are used for many reasons. Most often, braided sleeves are used to protect soft wiring cables or tubing from contact wear. Braided sleeves also act as a physical barrier from dirt and other contaminants. Braided sleeves are also often used to provide heat insulation and/or to provide a more aesthetic facade to the exterior of an otherwise unattractive cable or tube.

Regardless of the purpose of the braided sleeve, the braided sleeve itself is manufactured by interweaving strands of various materials. The materials selected depend upon the intended use of the braided sleeve. Braided sleeves used for wear protection are made from highly durable polymers. Braided sleeves used for thermal protection are made from fibers that have high insulation values. Braided sleeves used for aesthetics can be made of plated wire or colorful plastic.

Braided sleeves are commercially manufactured in long lengths and are rolled onto large spools. The braided sleeves are then selectively cut to length by an end user or by special order for an end user. Since braided sleeves are woven structures, they have a tendency to unravel at their edges. Accordingly, when a braided sleeve is cut to length, the cut end will begin to fray over time. In many situations, the tendency for the braided sleeves to unravel and fray at its ends is ignored. However, many users do not want the ends of a braided sleeve to fray at all. Accordingly, secondary manufacturing procedures are used to terminate the ends of a braided sleeve after the braided sleeve is cut to length.

Often the cut ends of a braided sleeve are subjected to high heat so that the newly cut strands melt and bond together. In U.S. Pat. No. 5,186,992, entitled Braided Product And Method Of Making Same, the braided sleeve is dipped in a flexible, curable polymer. As the polymer cures, it binds the strands of the braided sleeve. Consequently, when the braided sleeve is cut, the cut end does not unravel. Although such prior art termination techniques do prevent ends from fraying, such techniques often have unintended adverse effects. Braided sleeves, by the nature of their construction, increase in diameter as the braided sleeve is linearly compressed. This physical attribute is very useful when a braided sleeve is placed around a wire cable or tube. In applying a braided sleeve around a secondary object, the braided sleeve is cut to length and then compressed. The compressed braided sleeve becomes shorter and wider. It is therefore easier to pass the compressed braided sleeve around another object. Once in place, the braided sleeve is pulled to its normal length, wherein it returns to its normal diameter.

When a braided sleeve has its ends heat bonded or dipped, the bonding material prevents the braided sleeve from expanding when compressed. The braided sleeve therefore becomes more difficult to install. Furthermore, the dipping or coating of the braided sleeve covers the exterior of the braided sleeve. If the braided sleeve is made from visually pleasing materials, the dipped coating can detract from the aesthetics of the braided sleeve.

Braided sleeves are also used to protect cables and power cords that extend from junction boxes in the wall of a building. It is very problematic to anchor the cylindrical shape of a braided sleeve to the vertical plate covering a junction box. Typically, a braided sleeve is not attached to the junction box. Rather, the braided sleeve is just cut to length so that the braided sleeve terminates just before the junction box and hangs freely on the cable that extends into the junction box. Since the braided sleeve covers the cable, the braided sleeve is often kicked, pulled and otherwise stressed. This tends to pull the braided sleeve away from the junction box, wherein the braided sleeve rides down the cable and leaves the cable exposed near the junction box. If areas of the cable are left exposed, then these areas are unprotected by the braided sleeve. This leaves the underlying cable or wire vulnerable to damage in the area just outside a junction box, which is an area highly susceptible to damage. Furthermore, the hanging braided sleeve is aesthetically unappealing.

A need therefore exists for an improved manner of terminating braided sleeves at a junction box interface that prevents the ends of the braided sleeve from unraveling and also mechanically joins the end of a braided sleeve to the junction box. This need is met by the present invention as described and claimed below.

SUMMARY OF THE INVENTION

The present invention is a system and method of attaching a braided sleeve to a junction box so that the braided sleeve completely protects any cable or wire leading from the junction box. To attach the braided sleeve to the junction box, one end of the braided sleeve is engaged with a clamp. A faceplate is provided for the junction box. The clamp is interposed between the faceplate and the junction box, wherein the braided sleeve extends through an opening in the faceplate. The faceplate is mounted to the junction box or to a receptacle within the junction box. The clamp device is too large to pass through the opening in the faceplate. Consequently, the clamp and the end of the braided sleeve become trapped between the faceplate and the junction box. Any wire or cable that leads to the junction box passes through the center of the braided sleeve.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
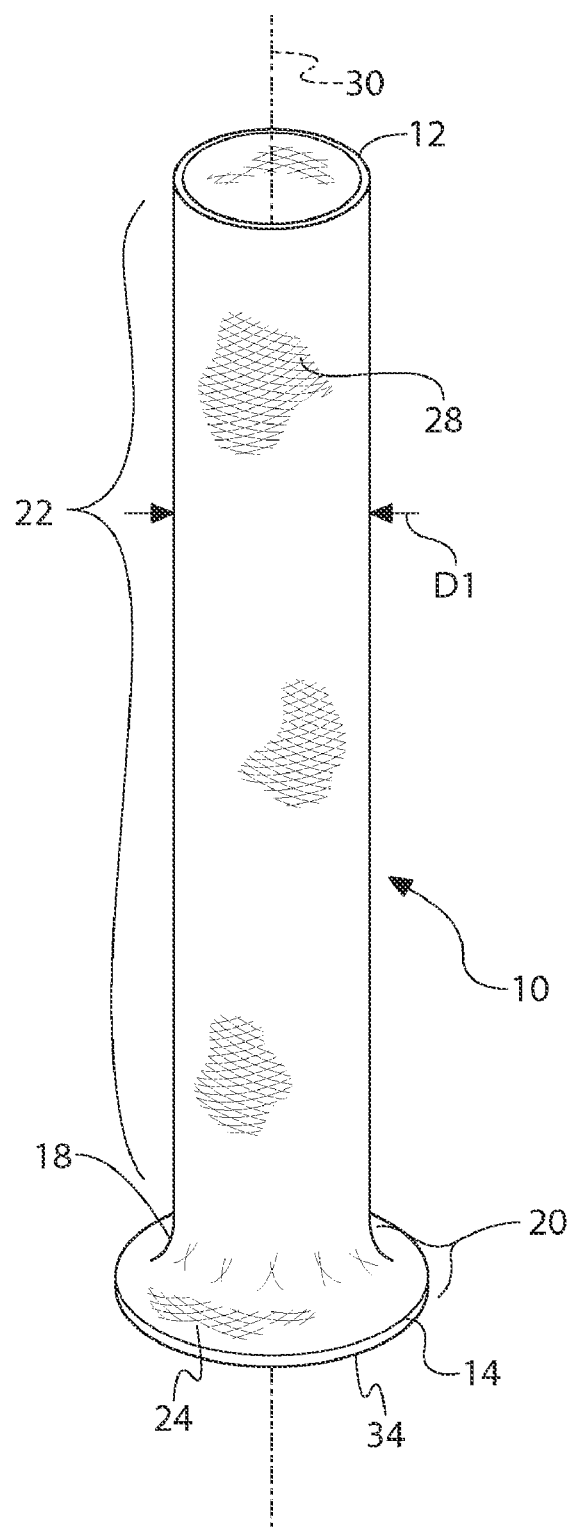
FIG. 1 is a side view of an exemplary embodiment of a braided sleeve in accordance with the present invention.
Figure 2:
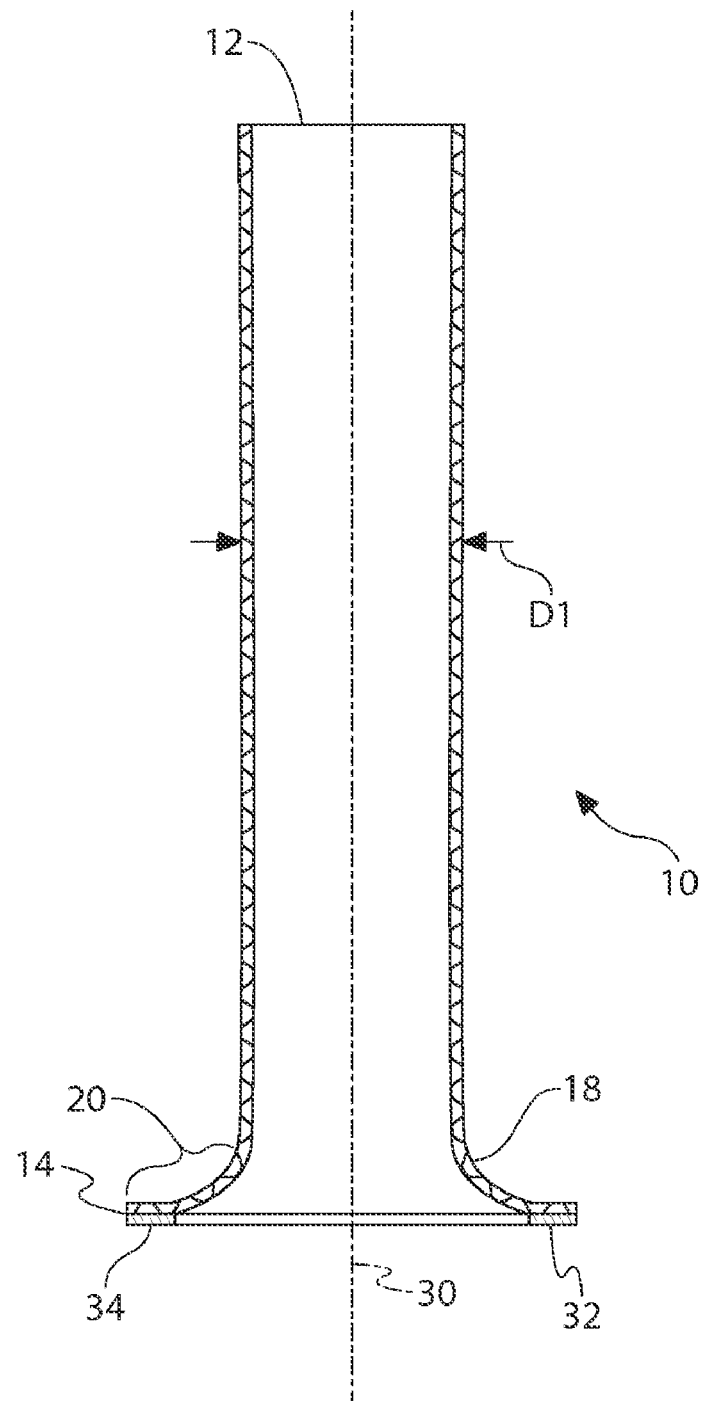
FIG. 2 is a cross-sectional view of the embodiment of FIG. 1.

Referring to FIG. 1 and FIG. 2, there is shown an exemplary embodiment of a braided sleeve 10 in accordance with the present invention. The braided sleeve 10 has a first end 12 and an opposite second end 14. The length of the braided sleeve 10 is irrelevant and depends upon the intended use of the braided sleeve 10. Thus, the braided sleeve 10 can have a length as short as a few inches or as long as many yards.

The braided sleeve 10 is flared near the second end 14, thereby creating a mounting flange structure 20 at the second end 14. The mounting flange structure 20 begins at a flange transition point 18 along the length of the braided sleeve 10. Due to the changing structure of the braided sleeve 10, the braided sleeve 10 has two sections. The first section is the uniform diameter section 22. The uniform diameter section 22 runs from the first end 12 of the braided sleeve 10 to the flange transition point 18. In the uniform diameter section 22, the braided sleeve 10 forms a tube having a uniform diameter D1. The diameter D1 of the uniform diameter section 22 is a matter of design choice and is selected depending upon the object the braided sleeve 10 is intended to cover. If the braided sleeve 10 is being used to cover a single wire cable, then the diameter of the braided sleeve 10 may be less than one inch. However, if a multi-wire cable is being covered, the diameter D1 of the uniform diameter section 22 may be a few inches across.

The second section of the braided sleeve 10 is the flared section 24. The flared section 24 encompasses the mounting flange structure 20. The flared section 24 begins at the flange transition point 18 and continues to the second end 14 of the braided sleeve 10. In the flared section 24, the diameter of the braided sleeve 10 increases. The diameter of the braided sleeve 10 at the flange transition point 18 is the same as the diameter D1 of the uniform diameter section 22. However, the diameter of the braided sleeve 10 at the second end 14 is at least fifty percent (50%) larger than that of the uniform diameter section 22.

The braided sleeve 10 is tubular in shape, being symmetrically formed around an imaginary longitudinal axis 30 that runs the length of the braided sleeve 10. The braided sleeve 10 is fabricated from a plurality of mono-filament or multi-filament strands 28 that are interwoven or "braided" to form the braided sleeve 10. There exist several weave patterns for strands that are used to form braided sleeves. Many of these weave patterns can be used in the fabrication of the present invention braided sleeve 10.

Each of the strands 28 used in the fabrication of the braided sleeve 10 remains a uniform distance from the longitudinal axis 30 in the uniform diameter section 22 of the braided sleeve 10. In the uniform diameter section 22 of the braided sleeve 10, the strands 28 either run parallel to the longitudinal axis 30 or orbit the longitudinal axis 30 in a helical pattern. However, once the strands 28 enter the flared section 24 of the braided sleeve 10, the strands 28 travel away from the longitudinal axis 30 of the braided sleeve 10, terminating in an orientation at the second end 14 that is generally perpendicular to the longitudinal axis 30.

The mounting flange structure 20 causes the second end 14 of the braided sleeve 10 to have a flat face surface 32 that lay in a plane perpendicular to the longitudinal axis 30 of the braided sleeve 10. A reinforcement ring 34 may be optionally applied to one or both sides of the mounting flange structure 20. The reinforcement rings 34 are preferably rings of thermoset adhesive or a piece of material that is coated in thermoset adhesive. In the shown embodiment, a single reinforcement ring 34 is shown that is uniformly made of a thermoset adhesive. The flat face surface 32 of the mounting flange structure 20 is heat bonded to the reinforcement ring 34 of thermoset adhesive. The reinforcement ring 34 of thermoset adhesive bonds the strands 28 of the braided sleeve 10 together along the flat face surface 32 of the mounting flange structure 20. This prevents the strands 28 from unraveling. However, since the reinforcement ring 34 only engages the flat face surface 32 of the mounting flange structure 20, the presence of the reinforcement ring 34 has little effect on the ability of the braided sleeve 10 to expand along its entire length.

Figure 3:
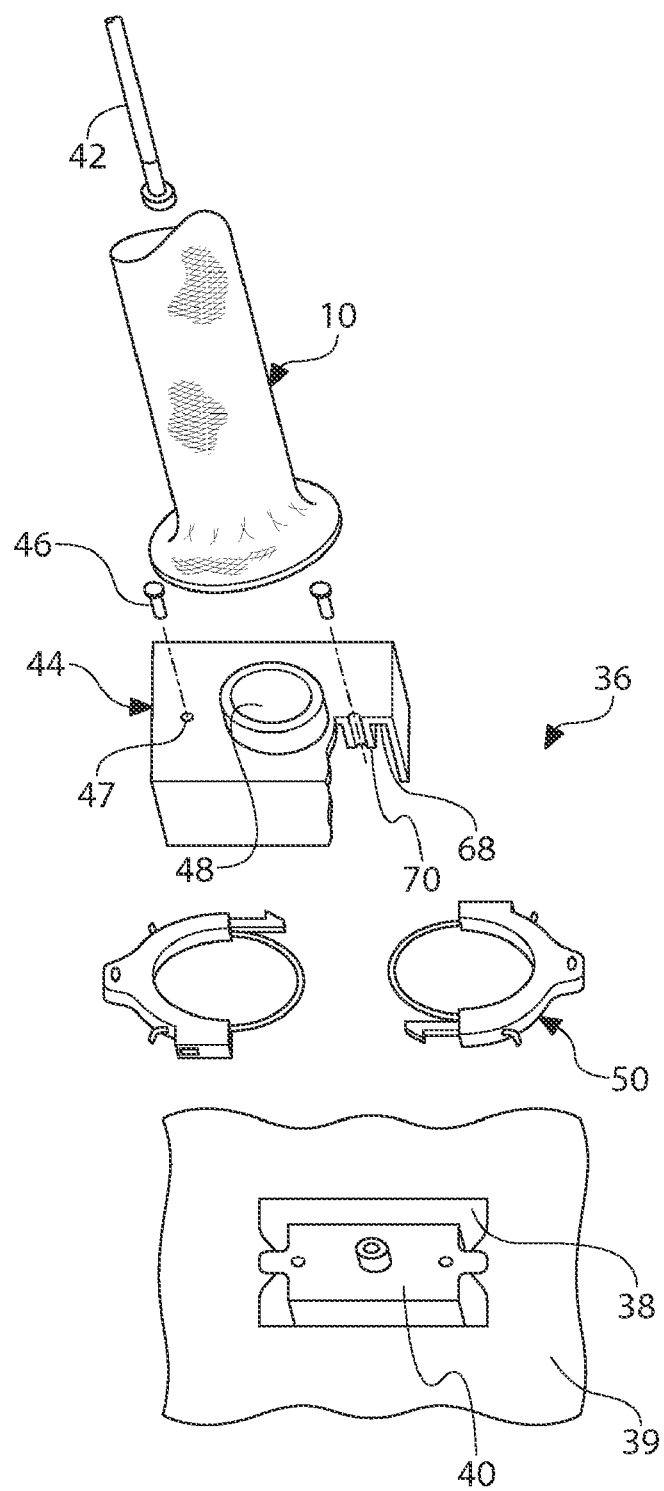
FIG. 3 is a perspective view of the braided sleeve shown in conjunction with a junction box and a junction box mounting system.

Referring to FIG. 3, the previously described braided sleeve 10 is shown in conjunction with a junction box mounting system 36. The junction box mounting system 36 is used to physically interconnect the braided sleeve 10 to a junction box 38 so that the braided sleeve 10 cannot be pulled away from the junction box 38.

In FIG. 3, a junction box 38 is shown mounted in a wall 39. Within the junction box 38 is mounted a receptacle 40 that is configured to receive the end of a wire or cable 42. There are many types of junction boxes, receptacle and cables. The illustrated embodiment is merely exemplary and is intended to represent most all junction boxes, receptacles, and cables.

The receptacle 40 is mounted within the junction box 38. The receptacle 40 and junction box 38 are covered by a faceplate 44. The faceplate 44 has a periphery larger than that of the receptacle 40 and junction box 38. In this manner, the faceplate 44 completely covers the receptacle 40 and junction box 38 when mounted into place.

The faceplate 44 is mounted in place using mounting screws 46. The mounting screws 46 pass through holes 47 in the faceplate 44 and join the faceplate 44 to either the structure of the junction box 38 or the structure of the receptacle 40 mounted in the junction box 38.

The faceplate 44 defines an opening 48 that is slightly larger than the uniform diameter section 22 of the braided sleeve 10. The uniform diameter section 22 of the braided sleeve 10 passes through the opening 48 in the faceplate 40. A clamp device 50 is provided. The clamp device 50 clamps around the mounting flange structure 20 of the braided sleeve 10, therein mechanically attaching the clamp device 50 to the braided sleeve 10. The clamp device 50 is larger than the opening 48 in the faceplate 44. Accordingly, the clamp device 50 cannot pass through the opening 48. The clamp device 50 engages the mounting flange structure 20 of the braided sleeve 10 between the faceplate 44 and the junction box 38. Accordingly, once the faceplate 44 is mounted to the junction box 38, the braided sleeve 10 cannot be pulled away from the junction box 38.

Figure 4:
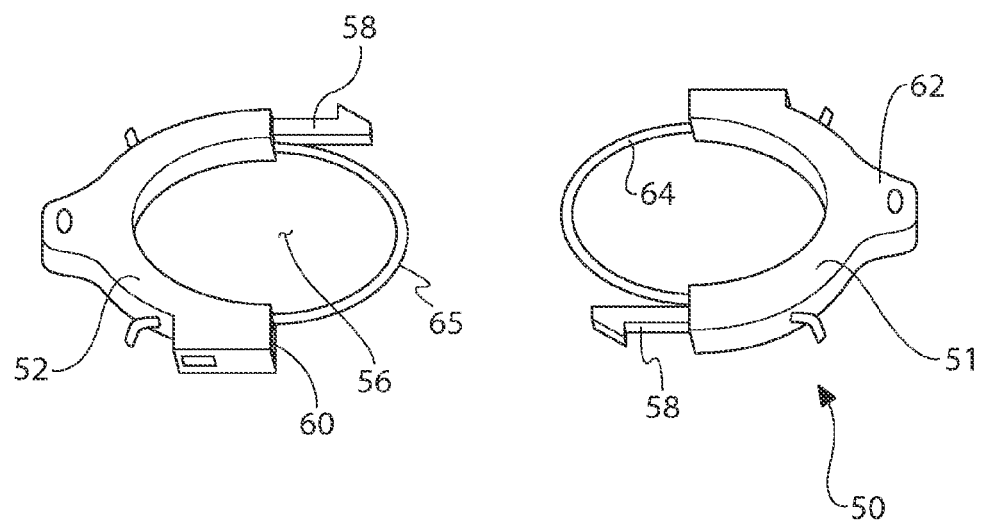
FIG. 4 is a perspective view of an exemplary embodiment of a clamp device used within the junction box mounting system.

Referring to FIG. 4 in conjunction with FIG. 3, an exemplary embodiment of a clamp device 50 is illustrated. The clamp device 50 includes two arcuate sections 51, 52 that can be selectively joined together to form an annular structure 54 with a central opening 56. The central opening 56 has a diameter D3, which is larger than the diameter D1 of the uniform diameter section 22 of the braided sleeve 10, but smaller than the diameter D2 of the mounting flange structure 20. In the shown embodiment, the two arcuate sections 51, 52 are identical. Each arcuate section 51, 52 has a locking pawl 58 at one end and a receptacle 60 for receiving a locking pawl at the opposite end. As such, the two arcuate sections 51, 52 can snap together to form an annular structure 54 without tools.

Each arcuate section 51, 52 also has at least one mounting projection 62 that radially extends from the periphery of the arcuate sections 51, 52. As will later be explained, the mounting projections 62 are used to attach the clamp device 50 to the faceplate 44 and to prevent any rotational movement of the clamp device 50 relative the faceplate 44.

The use of a snap-together two-piece clamp device 50 is only exemplary. There are many types of clamps, such as pipe flange clamps, that are used to engage radial flanges. Many of these clamp designs use arcuate sections that are hinged together and/or joined together by a mechanical fastener or clevis. Such clamp designs can be adapted for use as part of the present invention. The illustrated two-part clamp device 50 is selected because the design is easily and inexpensively molded from plastic.

Wire rings 64, 65 extend from each of the arcuate sections 51, 52. The wire rings 64, 65 overlap when the two arcuate sections 51, 52 are interconnected. When the two arcuate sections 51, 52 of the clamp device 50 are interconnected, the wire rings 64, 65 surround the central opening 56 within the clamp device 50. The arcuate sections 51, 52 compress the wire rings 64, 65 toward each other as the arcuate sections 51, 52 interconnect. In the shown embodiment, the wire rings 64, 65 are generally U-shaped and are not continuous. The ends of each of the wire rings 64, 65 are anchored to one of the arcuate sections 51, 52 of the clamp device 50. This configuration joins one of the wire rings 64, 65 to each of the arcuate sections 51, 52. It will be understood that the U-shaped wire rings 64, 65 can be replaced with circular rings or washers. The use of the wire rings 64, 65 is merely exemplary and is intended to include any and all rings and washers that can be compressed together within a clamp device 50.

The mounting flange structure 20 of the braided sleeve 10 is placed between the wire rings 64, 65 of the clamp device 50 before the arcuate sections 51, 52 are interconnected. Once the arcuate sections 51, 52 are interconnected, the mounting flange structure 20 becomes compressed between the wire rings 64, 65. This physically interconnects the clamp device 50 to the braided sleeve 10 so that the braided sleeve 10 cannot be simply pulled away from the clamp device 50.

The braided sleeve 10 and clamp device 50 interconnect with the faceplate 44. The rear of the faceplate 44 is open. The rear of the faceplate 44 defines an area 66 that is both large enough and deep enough to receive the clamp device 50 so that the clamp device 50 can be placed inside the faceplate 44 without effecting the ability of the faceplate 44 to mount flush against the junction box 38.

The faceplate 44 has an inside surface 68 that faces the clamp device 50. Features 70 are formed on the inside surface 68 of the faceplate 40 to interconnect the clamp device 50 to the faceplate 44. The features 70 include at least one structure that engages the mounting projections 62 on the arcuate sections 51, 52 of the clamp device 50 and prevent the clamp device 50 from being able to rotate relative the faceplate 44. The features may also include locking fingers 72 that snap over the arcuate sections 51, 52 and hold the clamp device 50 firmly in place against the faceplate 44.

As has been previously mentioned, the faceplate 44 has screw holes 47 for mounting screws 46 that can join the faceplate 44 to a junction box 38. Accordingly, by attaching the braided sleeve 10 to a clamp device 50, joining the clamp device 50 to the faceplate 44, and attaching a faceplate 44 to a junction box 38, the braided sleeve 10 can be firmly affixed to a junction box 38. As a consequence, the braided sleeve 10 cannot be pulled out of the wall.

Figure 5:
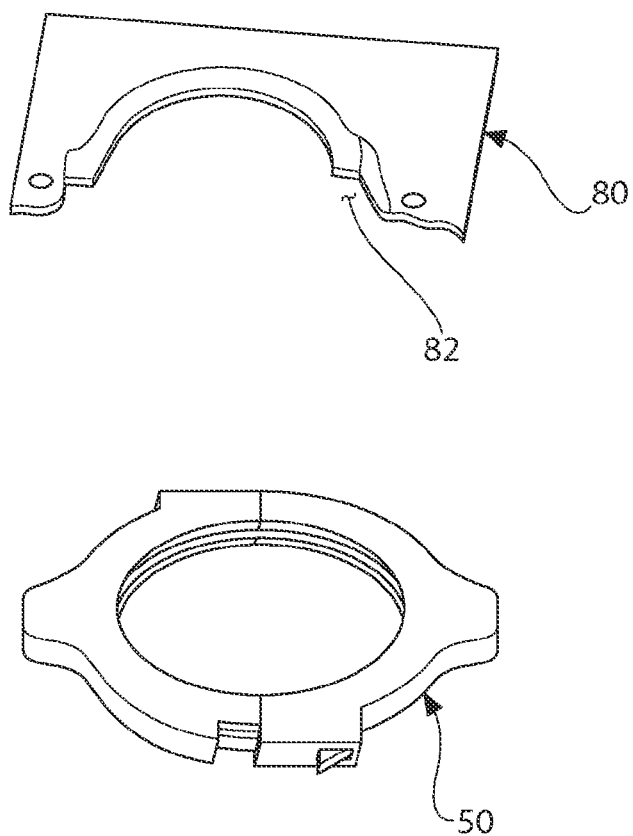
FIG. 5 shows an alternate embodiment of a faceplate shown in conjunction with a clamp device and braided sleeve.

In the embodiment of FIG. 4, the features 70 of the faceplate 44 that engaged the clamp device 50 extend from the rear of the faceplate 44. This configuration enables the front of the faceplate 44 to remain flat. Referring to FIG. 5, an alternate embodiment of a faceplate 80 is shown. In the embodiment of FIG. 5, the faceplate 80 is contoured with a relief 82. The relief 82 is sized and shaped to receive the clamp device 50. When assembled, the clamp device 50 passes into the relief 82. The contact between the surfaces of the relief 82 and the exterior of the clamp device 50 hold the clamp device 50 in a single orientation relative the faceplate 80.

In the embodiment of FIG. 5, the relief 82 is configured to receive the shape of the clamp device 50 illustrated in the earlier embodiments. It will be understood that the clamp device 50 can be fabricated with many different peripheral shapes. Accordingly, the relief 82 can also have many shapes. What is of importance is that the relief 82 is configured to received the shape of the clamp device 50 in a manner that holds the clamp device 50 in a generally fixed position.

It will be understood that the embodiments of the present invention that have been described and illustrated are only exemplary and that a person skilled in the art can make many variations to those embodiments. For example, in the shown embodiments, the braided sleeve has a continuous peripheral wall. It will be understood that braided sleeves with reclosable seams can also be used. The shape of the clamp device and the shape of the faceplate can be varied in many ways. All such variations, modifications and alternate embodiments are intended to be included within the scope of the present invention as set forth in the claims.

What is claimed is:

1. A method of attaching a braided sleeve to a junction box, comprising the steps of:
   providing a braided sleeve having a uniform diameter section of a first diameter that terminates at one end with a flared section of a larger second diameter;
   providing an annular clamp having at least one mounting projection extending therefrom;
   clamping said annular clamp to said flared section of said braided sleeve;
   providing a faceplate having an inside surface with structures that receive said annular clamp and engage said at least one mounting projection to prevent said annular clamp from being able to rotate relative said faceplate; and
   mounting said faceplate to said junction box, wherein said annular clamp is interposed between said faceplate and said junction box and wherein said uniform diameter section of said braided sleeve extends through said faceplate.

2. The method according to claim 1, wherein said faceplate defines an opening and said braided sleeve extends through said opening to said annular clamp.

3. The method according to claim 1, further including the step of mechanically interconnecting said annular clamp to said faceplate.

4. The method according to claim 1, wherein said step of providing a faceplate includes providing a faceplate with a relief set into said faceplate.

5. The method according to claim 4, further including the step of setting said annular clamp into said relief.

6. The method according to claim 1, wherein said step of providing a faceplate includes providing a faceplate with at least one fastener extending therefrom.

7. The method according to claim 6, wherein wherein said annular clamp is connected to said faceplate with said at least one fastener.

8. The method according to claim 1, wherein said step of providing an annular clamp includes providing an annular clamp with two ring structures, and said step of clamping said annular clamp to said flared section of said braided sleeve includes clamping said flared section between two ring structures.

9. The method according to claim 1, wherein said step of providing a faceplate includes providing a faceplate with screw holes formed therethrough.

10. The method according to claim 9, wherein said step of mounting said faceplate to said junction box includes attaching said faceplate to said junction box with screws.

11. The method according to claim 1, wherein said step of mounting said faceplate to said junction box includes mounting a receptacle to said junction box and attaching said faceplate to said receptacle.

12. A method of attaching a braided sleeve that surrounds a cable to a junction box from which said cable emanates, said method comprising the steps of:

provruding a braided sleeve having a uniform diameter section of a first diameter that terminates at one end with a flared section of a larger second diameter;

attaching a clamp to one end of said braided sleeve;

providing a faceplate that defines an opening larger than said braided sleeve and smaller than said clamp;

advancing said opening in said faceplate over said braided sleeve until said faceplate contacts said clamp;

interconnecting said clamp to said faceplate, therein preventing said clamp from being able to rotate relative said faceplate;

attaching said faceplate to said junction box, therein trapping said clamp between said faceplate and said junction box.

13. The method according to claim 12, wherein said step of attaching said faceplate to said junction box includes mounting a receptacle to said junction box and attaching said faceplate to said receptacle.

14. The method according to claim 12, wherein said step of providing a faceplate includes providing a faceplate with a relief set into said faceplate and setting said clamp into said relief.

15. The method according to claim 12, wherein said step of providing a faceplate includes providing a faceplate with at least one fastener extending therefrom.

* * * * *